US008857374B1

(12) United States Patent
Donegan et al.

(10) Patent No.: US 8,857,374 B1
(45) Date of Patent: Oct. 14, 2014

(54) HOPPER TYPE WILD BIRD FEEDER

(75) Inventors: Robert Donegan, Sedalia, CO (US);
James Carter, Denver, CO (US); Bryan Krueger, Denver, CO (US)

(73) Assignee: Classic Brands, LLC, Denver, CO (US)

( * ) Notice: Subject to any disclaimer, the term of this patent is extended or adjusted under 35 U.S.C. 154(b) by 0 days.

(21) Appl. No.: 13/107,841

(22) Filed: May 13, 2011

(51) Int. Cl.
*A01K 61/02* (2006.01)

(52) U.S. Cl.
USPC ....... 119/57.8; 119/52.2; 119/52.3; 119/52.4; 119/57.91

(58) Field of Classification Search
USPC .......... 119/57.8, 52.2, 51.01, 52.1, 429, 52.3, 119/464, 52.4, 57.9, 74, 537, 72; D30/124–128, 121
See application file for complete search history.

(56) References Cited

U.S. PATENT DOCUMENTS

| 117,807 A | 8/1871 | Orndoff |
| D8,908 S | 1/1876 | Wiley |
| 276,392 A | 4/1883 | Gregory |
| 447,006 A | 2/1891 | Sweeney |
| 632,167 A | 8/1899 | Biesmeyer |
| 727,597 A | 5/1903 | Day |
| 813,954 A | 2/1906 | Davis |
| D43,781 S | 4/1913 | Sanford |
| 1,251,935 A | 1/1918 | Stevens |
| D63,321 S | 11/1923 | Pirson |
| 1,558,316 A | 10/1925 | Tipple |
| 1,634,569 A | 7/1927 | Bray |
| 1,718,432 A | 6/1929 | Qualmann |
| D81,602 S | 7/1930 | Teague |
| 1,791,956 A | 2/1931 | Cowles |
| D87,460 S | 8/1932 | Cook |
| 1,879,318 A | 9/1932 | Klein |
| 1,891,042 A | 12/1932 | Benoit |
| D109,128 S | 4/1938 | Copeman |
| D115,321 S | 6/1939 | Pueschel |
| 2,283,373 A | 5/1942 | Krafft |
| 2,350,922 A | 6/1944 | Planeta |
| 2,417,178 A | 3/1947 | Ritter |
| D153,759 S | 5/1949 | Blatt |
| 2,510,721 A | 6/1950 | Smith |
| 2,531,915 A | 11/1950 | Maly |
| D164,692 S | 10/1951 | Kelly |
| D165,799 S | 1/1952 | Stedman |
| D167,179 S | 7/1952 | Stewart |
| 2,634,705 A | 4/1953 | Mayes |
| D170,150 S | 8/1953 | Kowap |
| D173,658 S | 12/1954 | Jones |

(Continued)

OTHER PUBLICATIONS

U.S. Appl. No. 29/437,619, filed Nov. 19, 2012, Krueger.

(Continued)

*Primary Examiner* — Andrea Valenti
(74) *Attorney, Agent, or Firm* — Polsinelli PC

(57) ABSTRACT

There are generally two styles of modern bird feeders: the tubular feeder with a tubular reservoir and several perches attached to the tubular reservoir at various positions around the reservoir, and the more traditional rectangular bin style with one or two feeding stations. These bin feeders are constructed to feed only general bird seed of mixed variety and are not selectively configurable to feed a specific small seed like thistle. The disclosed bin feeder includes removable and repositionable bin sidewalls with appropriately shaped upper and lower longitudinal edges to exclusively provide appropriate openings for thistle feed along one of the longitudinal edges or an appropriate opening for generally larger seed along the other of the longitudinal edges.

14 Claims, 13 Drawing Sheets

(56) References Cited

U.S. PATENT DOCUMENTS

| | | |
|---|---|---|
| 2,696,803 A | 12/1954 | Deffenbaugh |
| D174,139 S | 3/1955 | Sadler |
| 2,725,663 A | 12/1955 | Mullen |
| D178,917 S | 10/1956 | England et al. |
| 2,773,474 A | 12/1956 | Nugent |
| 2,786,446 A | 3/1957 | Wilson |
| D180,686 S | 7/1957 | Everett |
| 2,804,844 A | 9/1957 | Gigliotti |
| 2,887,987 A | 5/1959 | Fitzgerald et al. |
| D185,456 S | 6/1959 | Michalek et al. |
| 2,891,508 A | 6/1959 | Bower |
| 2,944,516 A * | 7/1960 | Malloy, Sr. ............ 119/52.2 |
| 2,971,671 A | 2/1961 | Shakman |
| 2,987,041 A | 6/1961 | Bard |
| 3,022,768 A * | 2/1962 | Lynch ............ 119/52.3 |
| 3,051,126 A | 8/1962 | Merritt et al. |
| 3,051,303 A | 8/1962 | Daanen |
| D193,558 S | 9/1962 | Perry |
| D194,750 S | 3/1963 | Dahmus |
| 3,090,354 A | 5/1963 | Merritt et al. |
| 3,136,296 A | 6/1964 | Luin |
| 3,145,690 A | 8/1964 | Bachman |
| D199,995 S | 1/1965 | Knodt |
| D200,778 S | 4/1965 | Pregont |
| 3,244,150 A | 4/1966 | Benton |
| D206,975 S | 2/1967 | Dawson |
| 3,307,602 A | 3/1967 | Boster |
| 3,316,884 A | 5/1967 | Viggars |
| 3,372,676 A | 3/1968 | Williams |
| D216,002 S | 11/1969 | Stone |
| D216,361 S | 12/1969 | Pappas, Jr. |
| 3,499,413 A | 3/1970 | Heard |
| D217,470 S | 5/1970 | Morrow |
| 3,526,335 A | 9/1970 | Swett et al. |
| 3,693,310 A | 9/1972 | Middleton |
| D230,948 S | 3/1974 | Moon |
| D234,180 S | 1/1975 | Dart et al. |
| D235,744 S | 7/1975 | England |
| 3,901,192 A | 8/1975 | Adams |
| 3,967,576 A | 7/1976 | Soerensen |
| 3,977,363 A | 8/1976 | Fisher, Jr. |
| D241,699 S | 10/1976 | Barecki |
| D241,860 S | 10/1976 | Calamia |
| D244,786 S | 6/1977 | Dryden |
| D244,883 S | 6/1977 | Rohrmuller |
| 4,030,451 A | 6/1977 | Miller |
| D245,349 S | 8/1977 | Fisher, Jr. |
| D245,643 S | 8/1977 | Orfei |
| D245,927 S | 9/1977 | Edwards et al. |
| D248,006 S | 5/1978 | Christian |
| D249,726 S | 9/1978 | Cosman |
| 4,144,842 A | 3/1979 | Schlising |
| 4,188,913 A | 2/1980 | Earl et al. |
| 4,194,714 A | 3/1980 | Schultz |
| 4,201,155 A | 5/1980 | Hyde, Jr. |
| D257,179 S | 9/1980 | Campo |
| 4,223,637 A | 9/1980 | Keefe |
| D258,338 S | 2/1981 | Gersin |
| D260,843 S | 9/1981 | Laird et al. |
| 4,327,669 A | 5/1982 | Blasbalg |
| 4,328,605 A | 5/1982 | Hutchison et al. |
| 4,331,104 A | 5/1982 | Clarke |
| D266,611 S | 10/1982 | Metts et al. |
| D267,355 S | 12/1982 | Blasbalg |
| D268,056 S | 2/1983 | Campbell-Kelly et al. |
| D268,362 S | 3/1983 | Wong |
| 4,389,975 A | 6/1983 | Fisher, Jr. |
| D272,507 S | 2/1984 | Conti |
| D272,508 S | 2/1984 | Conti |
| 4,444,324 A | 4/1984 | Grenell |
| D274,013 S | 5/1984 | Sun |
| D274,563 S | 7/1984 | Blasbalg |
| 4,466,376 A | 8/1984 | Wells |
| D276,510 S | 11/1984 | Bent et al. |
| D277,514 S | 2/1985 | Bescherer |
| D277,739 S | 2/1985 | Grammas et al. |
| D278,168 S | 3/1985 | Latham et al. |
| D278,751 S | 5/1985 | Seager |
| D282,019 S | 12/1985 | Kilham |
| D284,033 S | 5/1986 | Brodsky |
| D285,840 S | 9/1986 | Poon |
| D289,143 S | 4/1987 | Guillaume |
| D289,210 S | 4/1987 | Tucker et al. |
| D289,211 S | 4/1987 | Riha |
| 4,664,066 A | 5/1987 | Steuernagel et al. |
| D290,769 S | 7/1987 | Taylor |
| D290,773 S | 7/1987 | Liethen |
| 4,682,461 A | 7/1987 | Sizemore |
| D292,372 S | 10/1987 | Sykes |
| 4,712,512 A | 12/1987 | Schreib et al. |
| 4,732,112 A | 3/1988 | Fenner et al. |
| 4,738,221 A | 4/1988 | Nock |
| D297,074 S | 8/1988 | Burke et al. |
| 4,798,172 A | 1/1989 | Clarke |
| D299,770 S | 2/1989 | Coffer |
| 4,821,681 A | 4/1989 | Tucker |
| D300,882 S | 5/1989 | Olson |
| 4,896,628 A | 1/1990 | Kadunce |
| 4,901,673 A | 2/1990 | Overstreet |
| 4,938,168 A | 7/1990 | Meidell |
| D309,858 S | 8/1990 | Meyersburg |
| D313,169 S | 12/1990 | Scott et al. |
| 4,974,547 A | 12/1990 | Graham |
| 4,986,219 A | 1/1991 | Harris |
| 4,989,548 A | 2/1991 | Short et al. |
| 4,996,947 A | 3/1991 | Petrides |
| 5,033,411 A | 7/1991 | Brucker |
| D324,436 S | 3/1992 | Embree |
| 5,094,417 A | 3/1992 | Creed |
| 5,105,765 A | 4/1992 | Loken |
| D326,003 S | 5/1992 | Embree |
| D326,286 S | 5/1992 | Kerivan |
| 5,115,343 A | 5/1992 | Bennett |
| 5,140,945 A | 8/1992 | Barnhart et al. |
| D329,892 S | 9/1992 | Brister |
| 5,168,830 A | 12/1992 | Deglis |
| D334,133 S | 3/1993 | Hartzheim |
| 5,191,857 A | 3/1993 | Boaz |
| D334,635 S | 4/1993 | Wenstrand |
| D335,006 S | 4/1993 | Blasbalg |
| 5,207,180 A | 5/1993 | Graham |
| D337,271 S | 7/1993 | Pezzoli et al. |
| D338,317 S | 8/1993 | Woodward |
| 5,247,904 A | 9/1993 | Anderson |
| 5,255,631 A | 10/1993 | Anderson |
| 5,265,557 A | 11/1993 | Lovitz |
| 5,269,242 A | 12/1993 | Toldi |
| D343,030 S | 1/1994 | Harwick, Jr. |
| 5,289,796 A | 3/1994 | Armstrong |
| 5,291,855 A | 3/1994 | Laverty |
| D349,981 S | 8/1994 | Fasino |
| D351,691 S | 10/1994 | Lipton |
| D351,692 S | 10/1994 | Cossey |
| D352,575 S | 11/1994 | Bransky et al. |
| D352,787 S | 11/1994 | Hulse |
| 5,361,723 A | 11/1994 | Burleigh |
| D354,079 S | 1/1995 | Shapiro |
| D360,495 S | 7/1995 | Sanderson |
| D360,829 S | 8/1995 | Leeds |
| D365,893 S | 1/1996 | Thorp |
| D366,413 S | 1/1996 | Tober |
| 5,479,879 A | 1/1996 | Biek |
| 5,490,480 A | 2/1996 | Dumond |
| D370,313 S | 5/1996 | Nottingham et al. |
| D370,315 S | 5/1996 | Miller |
| D371,226 S | 6/1996 | Lee |
| D371,227 S | 6/1996 | Lee |
| D371,230 S * | 6/1996 | Nottingham et al. ........ D30/126 |
| D371,979 S | 7/1996 | Nottingham et al. |
| 5,533,467 A | 7/1996 | Lancia |
| 5,558,040 A | 9/1996 | Colwell et al. |
| D376,731 S | 12/1996 | Lin |
| D380,066 S * | 6/1997 | Green et al. ............ D30/124 |
| 5,655,477 A | 8/1997 | Hoffman et al. |

(56) References Cited

U.S. PATENT DOCUMENTS

| | | |
|---|---|---|
| D383,878 S | 9/1997 | Merino et al. |
| D384,443 S | 9/1997 | Olfert |
| D384,505 S | 10/1997 | Stewart |
| D386,834 S | 11/1997 | Nissim et al. |
| D386,835 S | 11/1997 | Passamare |
| D386,836 S | 11/1997 | Hunt |
| 5,682,835 A | 11/1997 | Walter et al. |
| D388,312 S | 12/1997 | Sorkin |
| 5,701,841 A | 12/1997 | Fasino |
| 5,711,247 A | 1/1998 | Henshaw |
| D390,490 S | 2/1998 | Ruderick |
| 5,729,949 A | 3/1998 | Hartzheim |
| 5,775,256 A | 7/1998 | Henshaw |
| 5,782,200 A | 7/1998 | Knowles et al. |
| D397,529 S | 8/1998 | Fuller et al. |
| D399,611 S | 10/1998 | Ericson et al. |
| 5,829,382 A | 11/1998 | Garrison |
| D406,307 S | 3/1999 | Kang |
| D408,420 S | 4/1999 | Buter |
| 5,947,054 A | 9/1999 | Liethen |
| D414,901 S | 10/1999 | Cirelli |
| D420,176 S | 2/2000 | Heinzeroth |
| D421,709 S | 3/2000 | Haslem et al. |
| D425,259 S | 5/2000 | Lang |
| 6,079,361 A | 6/2000 | Bowell et al. |
| D428,437 S | 7/2000 | Hmelar et al. |
| D428,537 S | 7/2000 | Miller |
| 6,095,087 A * | 8/2000 | Bloedorn .................... 119/52.2 |
| 6,119,627 A | 9/2000 | Banyas et al. |
| D431,760 S | 10/2000 | Sullivan |
| D433,633 S | 11/2000 | La Fata |
| 6,145,477 A | 11/2000 | Jansen |
| D434,980 S | 12/2000 | Suzuki |
| D435,666 S | 12/2000 | Barsomian |
| D440,361 S | 4/2001 | Colwell |
| 6,213,054 B1 | 4/2001 | Marshall |
| 6,253,706 B1 | 7/2001 | Sloop |
| D448,290 S | 9/2001 | Schultz et al. |
| 6,305,321 B1 * | 10/2001 | Potente ........................ 119/52.4 |
| D451,251 S | 11/2001 | Chrisco et al. |
| D452,929 S | 1/2002 | Perelli |
| 6,360,690 B1 | 3/2002 | Canby |
| 6,408,788 B1 | 6/2002 | Lieb et al. |
| D459,840 S | 7/2002 | Lian |
| 6,415,737 B2 | 7/2002 | Banyas et al. |
| 6,418,878 B1 | 7/2002 | Cathell et al. |
| D461,827 S | 8/2002 | Koebbe |
| 6,427,629 B1 | 8/2002 | Lush |
| D462,172 S | 9/2002 | Aurelio, Jr. |
| D462,286 S | 9/2002 | Perelli |
| 6,450,120 B1 * | 9/2002 | Nylen ........................ 119/52.2 |
| 6,457,439 B1 | 10/2002 | Engelking |
| D466,255 S | 11/2002 | Kuelbs |
| D466,656 S | 12/2002 | Kuelbs et al. |
| D467,513 S | 12/2002 | Neff |
| D468,368 S | 1/2003 | Jones |
| D470,630 S | 2/2003 | Kuelbs |
| D471,327 S | 3/2003 | Kuelbs |
| D472,490 S | 4/2003 | Perelli |
| 6,543,384 B2 | 4/2003 | Cote |
| 6,546,894 B2 | 4/2003 | Chrisco et al. |
| D475,128 S | 5/2003 | Svendsen et al. |
| 6,561,128 B1 | 5/2003 | Carter |
| 6,584,933 B1 | 7/2003 | Stone |
| 6,591,781 B2 | 7/2003 | Hardison |
| D478,475 S | 8/2003 | Backes et al. |
| 6,622,654 B2 | 9/2003 | Fasino |
| D480,291 S | 10/2003 | Sorkin |
| D482,262 S | 11/2003 | Sorkin |
| 6,659,041 B1 | 12/2003 | Curts |
| D485,930 S | 1/2004 | Chen |
| 6,701,867 B1 * | 3/2004 | Garrison ...................... 119/57.8 |
| D490,576 S | 5/2004 | Rich et al. |
| D491,019 S | 6/2004 | Marsden et al. |
| D491,443 S | 6/2004 | Lowery |
| D493,053 S | 7/2004 | Snell |
| D495,900 S | 9/2004 | Mayse |
| 6,789,916 B2 | 9/2004 | Ruggles |
| 6,792,891 B1 | 9/2004 | Coburn et al. |
| D497,226 S | 10/2004 | Nauert |
| D497,406 S | 10/2004 | King |
| D497,458 S | 10/2004 | Nauert |
| D499,515 S | 12/2004 | Schulzw et al. |
| D500,243 S | 12/2004 | Turek |
| 6,830,009 B1 | 12/2004 | Kuelbs |
| D500,668 S | 1/2005 | Kelly et al. |
| D503,019 S | 3/2005 | Swift et al. |
| 6,863,024 B1 | 3/2005 | Obenshain |
| 6,866,004 B1 | 3/2005 | Lush |
| D504,547 S | 4/2005 | Nauert |
| D504,746 S | 5/2005 | Lee |
| D505,521 S | 5/2005 | Schrodt |
| D505,755 S | 5/2005 | Lundstrom et al. |
| 6,895,894 B2 * | 5/2005 | Fort, II ........................ 119/57.8 |
| 6,901,882 B2 | 6/2005 | Kuelbs |
| D509,325 S | 9/2005 | Jung et al. |
| 6,945,192 B2 | 9/2005 | Cote |
| D511,866 S | 11/2005 | Lundstrom et al. |
| D512,661 S | 12/2005 | Morris et al. |
| D512,800 S | 12/2005 | Jung et al. |
| 6,986,322 B2 | 1/2006 | Lumpkin et al. |
| D514,319 S | 2/2006 | King et al. |
| D515,748 S | 2/2006 | Jung et al. |
| D515,916 S | 2/2006 | Bleuer |
| D516,413 S | 3/2006 | Anderson et al. |
| 7,017,517 B2 | 3/2006 | Paquette |
| 7,017,521 B2 | 3/2006 | Kuelbs |
| D518,380 S | 4/2006 | Moran |
| 7,021,241 B2 | 4/2006 | Nock |
| 7,032,538 B1 * | 4/2006 | Lush ........................... 119/52.1 |
| 7,032,539 B1 | 4/2006 | Obenshain |
| D522,180 S | 5/2006 | Goria, II |
| D523,141 S | 6/2006 | Massey |
| D524,490 S | 7/2006 | Obenshain |
| 7,086,352 B2 | 8/2006 | Goodger |
| 7,096,821 B2 | 8/2006 | Ruff |
| D535,445 S | 1/2007 | Obenshain |
| 7,168,392 B2 | 1/2007 | Kuelbs |
| 7,185,605 B1 | 3/2007 | Lush |
| D540,349 S | 4/2007 | Waki |
| D542,659 S | 5/2007 | Meether et al. |
| D542,982 S | 5/2007 | Wendell |
| D543,256 S | 5/2007 | Chen |
| D544,942 S | 6/2007 | Chen |
| 7,234,416 B2 | 6/2007 | Hoff |
| D548,587 S | 8/2007 | DuVal et al. |
| 7,258,075 B1 | 8/2007 | Jones et al. |
| 7,261,056 B2 | 8/2007 | Hunter et al. |
| D551,952 S | 10/2007 | Palmer |
| 7,278,613 B2 | 10/2007 | Roy |
| 7,287,486 B2 | 10/2007 | Hunter |
| D556,568 S | 12/2007 | DuVal |
| D557,595 S | 12/2007 | Ernst et al. |
| 7,302,911 B1 | 12/2007 | Lush |
| D558,567 S | 1/2008 | Ismert |
| D561,021 S | 2/2008 | DuVal et al. |
| D561,040 S | 2/2008 | Sequeira |
| D567,098 S | 4/2008 | Sequeira |
| D568,754 S | 5/2008 | Sequeira |
| 7,370,607 B2 | 5/2008 | O'Dell |
| 7,373,901 B2 | 5/2008 | Baynard |
| D575,118 S | 8/2008 | Bignon |
| D575,591 S | 8/2008 | Bonetti |
| 7,409,922 B1 | 8/2008 | Baynard et al. |
| D578,379 S | 10/2008 | Sorkin |
| D581,183 S | 11/2008 | Kutscha et al. |
| D581,259 S | 11/2008 | Portz |
| 7,448,346 B1 | 11/2008 | Stone et al. |
| 7,451,580 B2 | 11/2008 | Kelly et al. |
| 7,469,656 B2 | 12/2008 | Hunter et al. |
| 7,484,475 B2 | 2/2009 | Milliner |
| 7,503,282 B1 | 3/2009 | Lush |
| 7,506,611 B1 * | 3/2009 | Lush ........................... 119/52.1 |
| D590,541 S | 4/2009 | Chaoui |

(56) References Cited

U.S. PATENT DOCUMENTS

| | | | |
|---|---|---|---|
| 7,516,716 B2 | 4/2009 | Puckett et al. |
| D591,589 S | 5/2009 | Myers et al. |
| D592,046 S | 5/2009 | Myers et al. |
| D592,362 S | 5/2009 | Rutherford et al. |
| 7,530,330 B1 | 5/2009 | Valle |
| D594,737 S | 6/2009 | Kelly et al. |
| 7,540,260 B2 | 6/2009 | Rich et al. |
| 7,540,262 B2 | 6/2009 | Kuelbs |
| 7,549,394 B2 | 6/2009 | Nock |
| D596,033 S | 7/2009 | Zach et al. |
| D599,159 S | 9/2009 | Stein |
| D600,099 S | 9/2009 | Dahlin |
| 7,610,875 B2 | 11/2009 | Webber |
| D606,447 S | 12/2009 | West et al. |
| D606,708 S | 12/2009 | McMullen |
| D607,612 S | 1/2010 | Yang |
| D609,064 S | 2/2010 | Najaryn et al. |
| D609,864 S | 2/2010 | Tsai |
| 7,654,225 B2 | 2/2010 | Madsen et al. |
| D612,108 S | 3/2010 | Torres et al. |
| D612,730 S | 3/2010 | Rushe |
| 7,669,553 B2 | 3/2010 | White et al. |
| D614,019 S | 4/2010 | Goodman et al. |
| D616,040 S | 5/2010 | Spencer |
| D616,288 S | 5/2010 | Simon et al. |
| 7,721,677 B1 | 5/2010 | McClaskey |
| 7,726,259 B2 | 6/2010 | Hepp et al. |
| 7,739,982 B2 | 6/2010 | Cote |
| 7,743,732 B2 | 6/2010 | Webber |
| D620,074 S | 7/2010 | Muhlenbruck |
| D621,241 S | 8/2010 | Mirer et al. |
| D621,268 S | 8/2010 | Morabito |
| D622,910 S | 8/2010 | Puckett |
| D623,805 S | 9/2010 | Vosbikian |
| 7,798,099 B2 | 9/2010 | Vosbikian |
| 7,874,264 B2 | 1/2011 | McMullen |
| D632,952 S | 2/2011 | Dablemont |
| D635,844 S | 4/2011 | Boothby |
| D636,238 S | 4/2011 | Elmelund |
| 7,930,994 B2 | 4/2011 | Stone et al. |
| D638,501 S | 5/2011 | Fishman |
| D638,588 S | 5/2011 | Vosbikian |
| 7,958,845 B2 | 6/2011 | Gardner |
| D643,442 S | 8/2011 | Sato et al. |
| D643,855 S | 8/2011 | Taniguchi et al. |
| D644,090 S | 8/2011 | Sittig |
| 7,997,434 B2 | 8/2011 | Benetti |
| 8,006,642 B2 | 8/2011 | Vosbikian |
| 8,028,490 B2 | 10/2011 | Kelly et al. |
| D649,299 S | 11/2011 | Lush |
| D649,302 S | 11/2011 | Hickok |
| D650,261 S | 12/2011 | McDuff et al. |
| 8,070,380 B2 | 12/2011 | Pucillo et al. |
| D652,059 S | 1/2012 | Sato et al. |
| D656,690 S | 3/2012 | Tu |
| D657,399 S | 4/2012 | Nemoto |
| 8,156,894 B1 | 4/2012 | Krah |
| D658,684 S | 5/2012 | Roman |
| D661,573 S | 6/2012 | Paik et al. |
| D664,307 S | 7/2012 | Krueger et al. |
| D664,437 S | 7/2012 | Barel |
| 8,230,809 B2 | 7/2012 | Cote |
| 8,245,666 B2 | 8/2012 | Sena et al. |
| D667,294 S | 9/2012 | Wang |
| 8,272,607 B2 | 9/2012 | Bonnema |
| 8,276,541 B2 | 10/2012 | LoRocco et al. |
| D671,276 S | 11/2012 | Krueger |
| D671,277 S | 11/2012 | Vosbikian et al. |
| D671,692 S | 11/2012 | Carter |
| 8,347,818 B2 | 1/2013 | Cowger et al. |
| D676,614 S | 2/2013 | Fields et al. |
| D677,016 S | 2/2013 | Carter |
| 8,413,605 B2 | 4/2013 | Baynard et al. |
| 2003/0033985 A1 | 2/2003 | Hardison |
| 2003/0136347 A1 | 7/2003 | Fasino |

| | | | |
|---|---|---|---|
| 2003/0226514 A1* | 12/2003 | Cote | 119/57.9 |
| 2004/0098942 A1 | 5/2004 | Lee et al. | |
| 2004/0216684 A1 | 11/2004 | Obenshain | |
| 2004/0231606 A1 | 11/2004 | Nock | |
| 2004/0250777 A1 | 12/2004 | Stachowiak | |
| 2004/0261726 A1 | 12/2004 | Lumpkin | |
| 2005/0120967 A1 | 6/2005 | Ruff | |
| 2005/0257749 A1 | 11/2005 | Kuelbs | |
| 2005/0263085 A1 | 12/2005 | Rich | |
| 2006/0225658 A1 | 10/2006 | Baynard | |
| 2006/0266295 A1 | 11/2006 | McDarren | |
| 2006/0272585 A1 | 12/2006 | O'Dell | |
| 2007/0034160 A1 | 2/2007 | Nock | |
| 2007/0163506 A1 | 7/2007 | Bloedorn | |
| 2007/0227453 A1 | 10/2007 | Puckett et al. | |
| 2007/0227454 A1 | 10/2007 | Fahey | |
| 2007/0266951 A1 | 11/2007 | Berns | |
| 2008/0022936 A1 | 1/2008 | Stone et al. | |
| 2008/0078329 A1 | 4/2008 | Hunter et al. | |
| 2008/0105206 A1 | 5/2008 | Rich et al. | |
| 2008/0127902 A1 | 6/2008 | Bent et al. | |
| 2008/0134979 A1 | 6/2008 | Crocker | |
| 2008/0210172 A1 | 9/2008 | Waikas | |
| 2008/0276874 A1 | 11/2008 | Evans | |
| 2008/0302304 A1 | 12/2008 | Mayfield | |
| 2009/0020075 A1 | 1/2009 | Wood et al. | |
| 2009/0071408 A1 | 3/2009 | Wechsler | |
| 2009/0223456 A1 | 9/2009 | Hunter et al. | |
| 2009/0260576 A1 | 10/2009 | Vosbikian | |
| 2009/0283046 A1 | 11/2009 | Black | |
| 2009/0304900 A1 | 12/2009 | Augustin | |
| 2010/0061091 A1 | 3/2010 | Galipeau et al. | |
| 2010/0089330 A1 | 4/2010 | McMullen | |
| 2010/0258054 A1 | 10/2010 | Frazier | |
| 2010/0288200 A1 | 11/2010 | Lush | |
| 2011/0067637 A1 | 3/2011 | Baynard | |
| 2011/0073043 A1 | 3/2011 | Dault | |
| 2011/0083609 A1 | 4/2011 | Cote | |
| 2011/0088626 A1 | 4/2011 | Hepp et al. | |
| 2011/0180004 A1* | 7/2011 | Humphries et al. | 119/51.5 |
| 2011/0226186 A1 | 9/2011 | Hunter et al. | |
| 2012/0037080 A1 | 2/2012 | Hepp et al. | |
| 2012/0055410 A1* | 3/2012 | Cote | 119/52.3 |
| 2012/0234249 A1 | 9/2012 | Gaze | |

OTHER PUBLICATIONS

U.S. Appl. No. 29/437,624, filed Nov. 19, 2012, Krueger.
U.S. Appl. No. 29/390,071, filed Apr. 19, 2011, Krueger et al.
U.S. Appl. No. 29/387,515, filed Mar. 14, 2011, Carter et al.
U.S. Appl. No. 29/387,516, filed Mar. 14, 2011, Carter.
U.S. Appl. No. 29/387,517, filed Mar. 14, 2011, Krueger.
U.S. Appl. No. 29/387,518, filed Mar. 14, 2011, Krueger et al.
U.S. Appl. No. 29/387,519, filed Mar. 14, 2011, Carter.
U.S. Appl. No. 29/387,520, filed Mar. 14, 2011, Krueger.
U.S. Appl. No. 13/420,063, filed Mar. 14, 2012, Carter et al.
U.S. Appl. No. 13/420,086, filed Mar. 14, 2012, Carter et al.
U.S. Appl. No. 29/416,886, filed Mar. 28, 2012, Carter.
U.S. Appl. No. 29/416,887, filed Mar. 28, 2012, Carter.
U.S. Appl. No. 29/427,461, filed Jul. 18, 2012, Krueger et al.
*Ex Parte Quayle Action*, Design U.S. Appl. No. 29/390,071, mailed Dec. 20, 2011, 4 pages.
Notice of Allowance, Design U.S. Appl. No. 29/390,071, mailed Mar. 26, 2012, 7 pages.
Response to *Ex Parte Quayle Action*, Design U.S. Appl. No. 29/390,071, filed Mar. 19, 2012, 20 pages.
Response to Restriction Requirement, Design U.S. Appl. No. 29/390,071, filed Dec. 12, 2011, 2 pages.
Restriction Requirement, Design U.S. Appl. No. 29/390,071, mailed Oct. 11, 2011, 4 pages.
Notice of Allowance, Design U.S. Appl. No. 29/427,461, mailed Oct. 4, 2012, 15 pages.
Restriction Requirement, Design U.S. Appl. No. 29/387,519, mailed Jun. 13, 2012, 4 pages.
Notice of Allowance, Design U.S. Appl. No. 29/387,520, mailed Jun. 15, 2012, 10 pages.

(56) References Cited

OTHER PUBLICATIONS

*Ex Parte Quayle Action*, Design U.S. Appl. No. 29/387,515, mailed Jun. 20, 2012, 5 pages.
Response to Restriction Requirement, Design U.S. Appl. No. 29/387,519, filed Jul. 5, 2012, 2 pages.
Non-Final Office Action, U.S. Appl. No. 29/387,516, mailed Jul. 6, 2012, 7 pages.
Response to *Ex Parte Quayle Action*, U.S. Appl. No. 29/387,515, filed Aug. 20, 2012, 7 pages.
Final Quayle Action, Design U.S. Appl. No. 29/387,515, mailed Aug. 28, 2012, 5 pages.
Notice of Allowance, Design U.S. Appl. No. 29/387,519, mailed Sep. 13, 2012, 11 pages.
Restriction Requirement, Design U.S. Appl. No. 29/387,517, mailed Oct. 12, 2011, 4 pages.
Response to Restriction, Design U.S. Appl. No. 29/387,517, filed Dec. 12, 2011, 2 pages.
Non-Final Office Action, Design U.S. Appl. No. 29/387,517, mailed Mar. 12, 2012, 7 pages.
Response to Non-Final Office Action, Design U.S. Appl. No. 29/387,517, filed Jun. 12, 2012, 13 pages.
Notice of Allowance, Design U.S. Appl. No. 29/387,517, mailed Jul. 3, 2012, 11 pages.
Response to Restriction Requirement, Design U.S. Appl. No. 29/416,890 filed Sep. 4, 2012, 13 pages.
Response to Non-Final Office Action, Design U.S. Appl. No. 29/687,516, filed Nov. 6, 2012, 10 pages.
Response to Final Office Action, Design U.S. Appl. No. 29/387,515, filed Nov. 19, 2012, 4 pages.
Cedar Works Squirrel Bin Feeder (date unknown), 10 pages, offered for sale no later than Mar. 13, 2010; also located at http://www.homedepot.com/webapp/wcs/stores/servlet/ProductDisplay?productId=203271339&storeId=10051&langId=-&catalogId=10053&cpncode=%2d1989988612d2&srccode=cii%5f22032207&cmmmc=shopping%2d%5f%2dthefind (last accessed Nov. 27, 2012), 3 pages.
U.S. Appl. No. 29/416,890, filed Mar. 28, 2012, Krueger.
U.S. Appl. No. 29/438,289, filed Nov. 28, 2012, Bruno et al.
U.S. Appl. No. 29/438,291, filed Nov. 28, 2012, Bruno et al.
U.S. Appl. No. 29/448,176, filed Mar. 11, 2013, Carter.
U.S. Appl. No. 13/855,523, filed Apr. 2, 2013, Donegan et al.
U.S. Appl. No. 13/855,565, filed Apr. 2, 2013, Donegan et al.
U.S. Appl. No. 13/901,321, filed May 23, 2013, Carter et al.
*Ex Parte Quayle Action*, U.S. Appl. No. 29/437,624, mailed Jun. 7, 2013, 23 pages.
Notice of Allowance, U.S. Appl. No. 29/387,515, mailed Dec. 18, 2012, 14 pages.
Notice of Allowance, U.S. Appl. No. 29/387,516, mailed Nov. 13, 2012, 11 pages.
Notice of Allowance, U.S. Appl. No. 29/387,518, mailed Dec. 21, 2012, 24 pages.
Notice of Allowance, U.S. Appl. No. 29/387,520, mailed Dec. 21, 2012, 8 pages.
Notice of Allowance, U.S. Appl. No. 29/416,886, mailed Jan. 10, 2013, 15 pages.
Notice of Allowance, U.S. Appl. No. 29/416,887, mailed Dec. 26, 2012, 15 pages.
Notice of Allowance, U.S. Appl. No. 29/416,890, mailed Dec. 20, 2012, 24 pages.
Non-Final Office Action, U.S. Appl. No. 13/855,565, mailed Sep. 27, 2013, 32 pages.
Non-Final Office Action, U.S. Appl. No. 13/855,523, mailed Sep. 30, 2013, 29 pages.
Non-Final Office Action, U.S. Appl. No. 13/420,086, mailed Oct. 7, 2013, 23 pages.

* cited by examiner

US 8,857,374 B1

HOPPER TYPE WILD BIRD FEEDER

BACKGROUND

This application claims benefit from provisional patent application Ser. No. 61/330,842 which was filed May 13, 2010.

A traditional style of feeder for presenting seed to wild birds is the hopper style. This feeder is usually rectangular with a gable roof to protect the bin containing the seed, and a pair of window sidewalls forming the front and back walls for the bin. These sidewalls form a slot at the bottom of the bin for the seed in the bin to spill out onto a tray. Birds stand along the edges of the tray and feed from the spilled seed that seeps below the sidewalls of the hopper into the tray.

It is usual for these two sidewalls to be made of transparent material, usually a rectangular panes of plastic. This permits the owner of the bird feeder to see from a distance whether the bin needs to be refilled with birdseed.

Another type of feeder available from Cedar Works includes a single transparent sidewall made of a polymer sheet. This sidewall has a single notch along one edge. This sidewall can be removed from the slots in which it normally rests, the slots extending along the edges of the lateral walls. These lateral walls are made of wood. The transparent sidewall is accessed through a hinged lid which normally overlies the upper edge of the sidewall. This sidewall can be removed and flipped over, placing the notch either along the top edge or bottom edge of the sidewall. When the notch is positioned at the upper edge of the sidewall this feeder is intended for squirrels only. The owner of the feeder can enjoy watching this squirrel lift the hinge lid and reach inside to feed on the corn or other seeds in the bin. Alternatively the sidewall can be placed so that the single slot is located at the bottom. In this condition the seed is able to spill out on to the flat trough in front of the sidewall, so that birds as well as squirrels can be feed simultaneously from the same supply of seeds.

However there are other styles of feeders, for example tube style feeders that are intended to feed birds only. Among such tube feeders are feeders with very small restricted feed ports sized to permit small birds such as finches to access thistle seeds, apparently one of such small bird's favorite foods. Other feeders have a substantially larger port for feeding larger seeds to larger species of birds. There are also tube type feeders with adjustable or two position feeder ports. These feeders have rotating or sliding shutter that changes the size of the seed port from that appropriate for feeding the small thistle seeds, or alternatively the shutter is moved to expose or create a larger port for the passage of large seeds.

SUMMARY

Disclosed is a bin type feeder for wild birds with gable roof and adjustable perches that can be spaced controllably from a pair of oppositely facing sidewalls with feeding troughs at the lower edges of these sidewalls. These sidewalls are removable and reversible so that small feeder ports located along one longitudinal edge of the sidewall can be positioned either along the bottom edge adjacent the feeding trough to form a feeder specifically designed to feed small thistle type seed, or the sidewalls can be inverted to properly position a single broad slot or arch formed along the bottom edge of the sidewall. In this configuration the bin type feeder is appropriate for feeding bird feeds that include large seeds like sunflower seeds, with the small thistle-sized ports positioned along the uppermost edge of the sidewall out of access or contact with the supply of seed contained in the bin.

DETAILED DESCRIPTION OF THE PREFERRED EMBODIMENT

Figure 1:
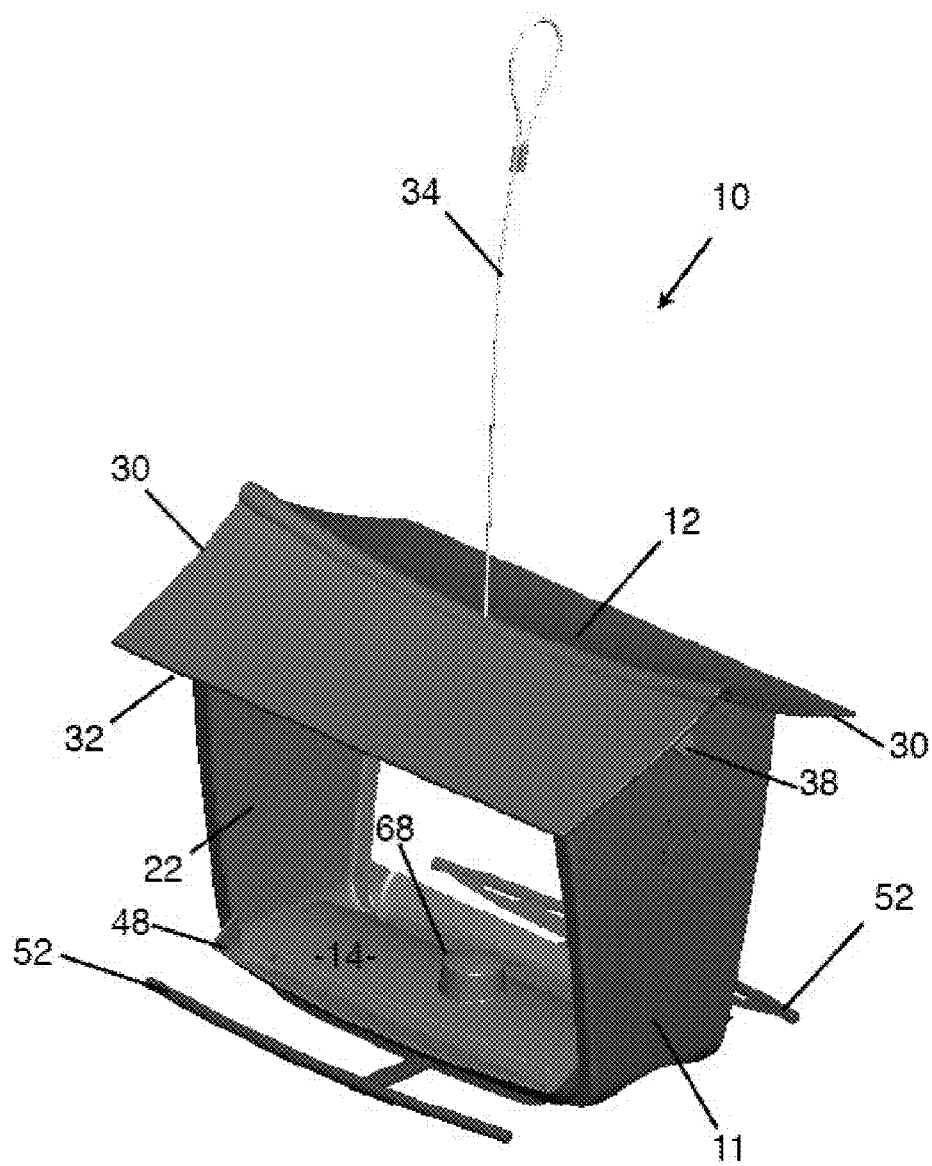
FIG. 1 is the perspective view of the bin type feeder according to this disclosure with thistle type ports aligned along the lower edge of the removable transparent sidewall.
Figure 2:
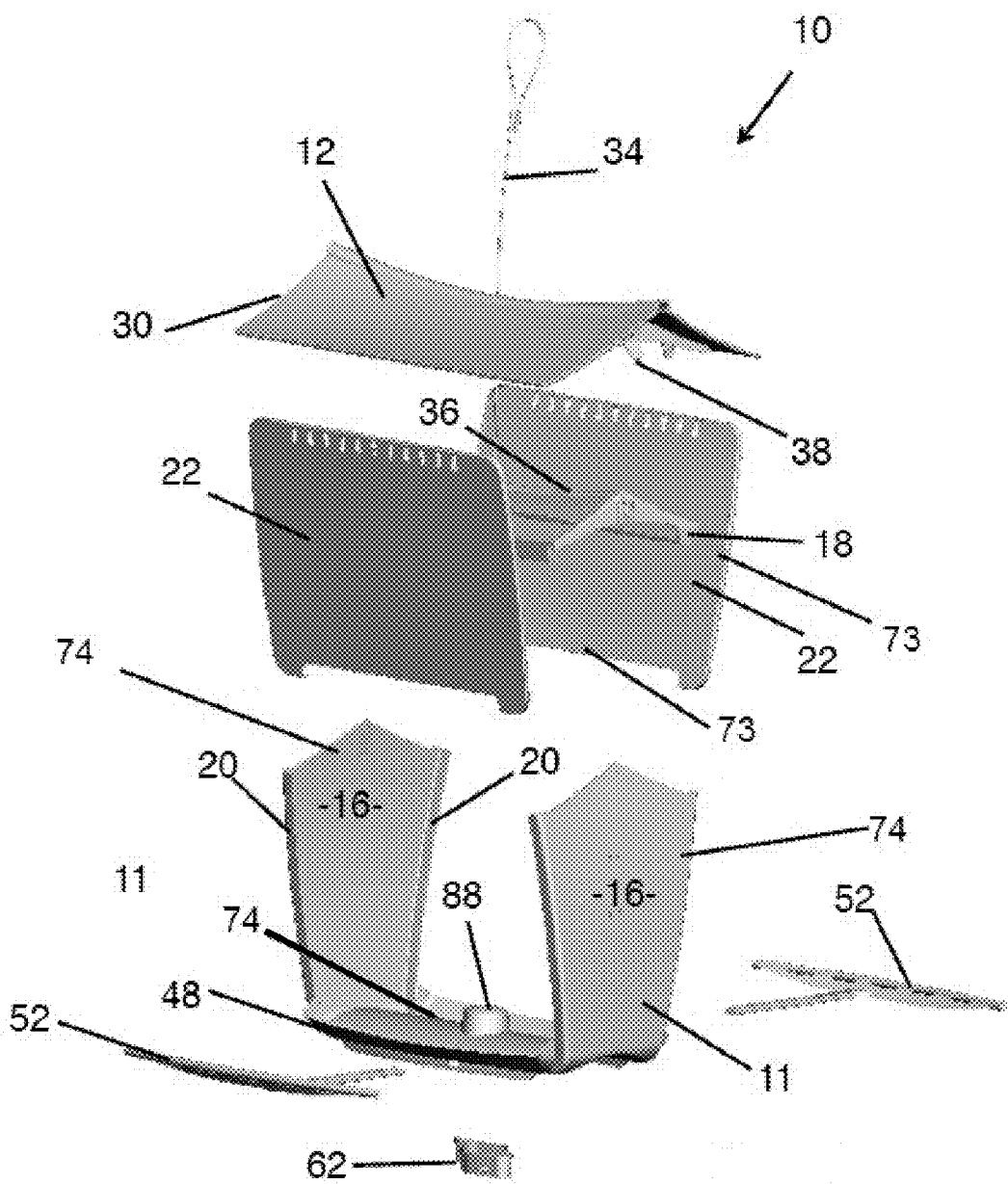
FIG. 2 is an exploded view of the parts is to assemble the bin type feeder of FIG. 1.
Figure 3:
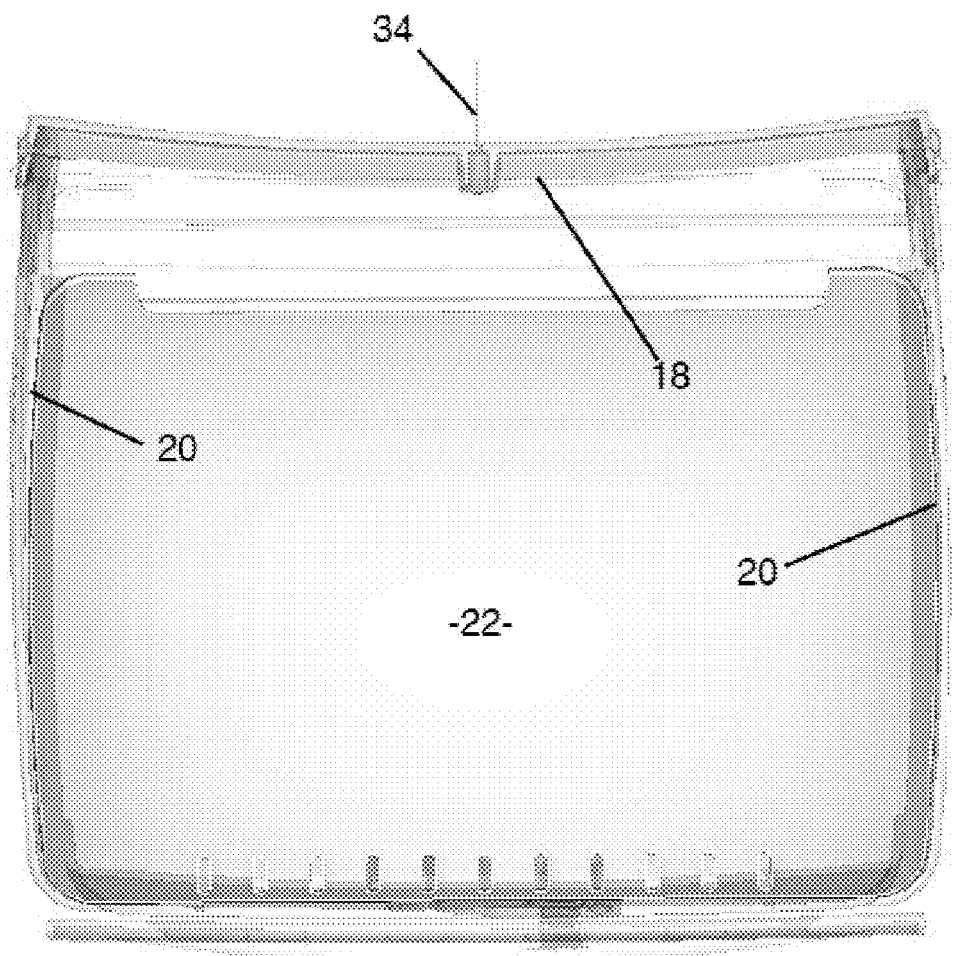
FIG. 3 is an elevation view showing the sidewall in place in slots along the side of the bin.

Referring to the accompanying figures, the feeder 10 has a bin 75 with sides that include at least one removable sidewall 22, and end walls 16, shown here as gable ends. All sides have edge portions, sidewall edge portions 73 and end wall edge portions 74, some of which, specifically the inward facing grooves 20 on the end wall edge portions 74, are sized and positioned to releasably hold a portion of the removable sidewalls.

As seen in the figures, the disclosed bin feeder 10 for wild birds is preferably made of an assembly of eight injection molded parts, and five fasteners. The hopper chassis 11 is an injection molded part with a substantially horizontally extending base which forms the floor 14 of the seed supply bin and generally upstanding end walls 16 integrally molded with the base. These end walls define a generally trapezoid shape with a wider upper portion and narrower bottom portion. The end walls are held in proper position by the hopper hanger panel 18 which extends across the uppermost edges of the end walls. The hopper panel is fastened to the end walls at each end by a single self-tapping pan head screw.

A pair of adjustable perches is attached to the bottom surface of the bottom wall by the perch mount. The pair of adjustable perches and perch mount will be detailed below.

As shown in the figures, the end walls of the hopper chassis have inwardly facing grooves 20 to receive the corresponding edge portions of pair of specially formed sidewalls. These sidewalls 22 and 22 are preferably comprised of rectangular panels of die-cut polymer sheeting. These sidewalls are preferably transparent or at least translucent to permit the owner to assess at a glance whether the supply of seed contained in the seed bin formed between the end walls the removable side walls 22 and beneath the roof 12 is adequate or needs to be replenished.

Above all these parts and assemblies, a roof extends to shelter most of the rest of the construction from precipitation. The roof preferably has a gently sloping gable shape with protruding gable ends 30 and protruding rake edges 32 that form an overall look of a small gabled house. A robust wire or cable hanger 34 extends from a point where it is fixed at the geometric centre of the ridge beam portion 36 of the hanger panel 18, then up through a hole through the corresponding center of the roof, to an attachment loop at its distal end. As will be detailed, the roof has a pair of flexible finger-operated detents or latches 38 and 38 that snap onto and release from protrusions at the ridge of the gable ends of the hanger panel. Once the latches 38 are released the roof can be slid upwardly on the hanging wire to permit access to the large rectangular opening at the top of the bin for replenishing the seed in the bin hopper.

The removable roof also permits the side walls to be removed and selectively repositioned for dispensing either small thistle-type seed or larger general type seed, as will be detailed.

Figure 4:
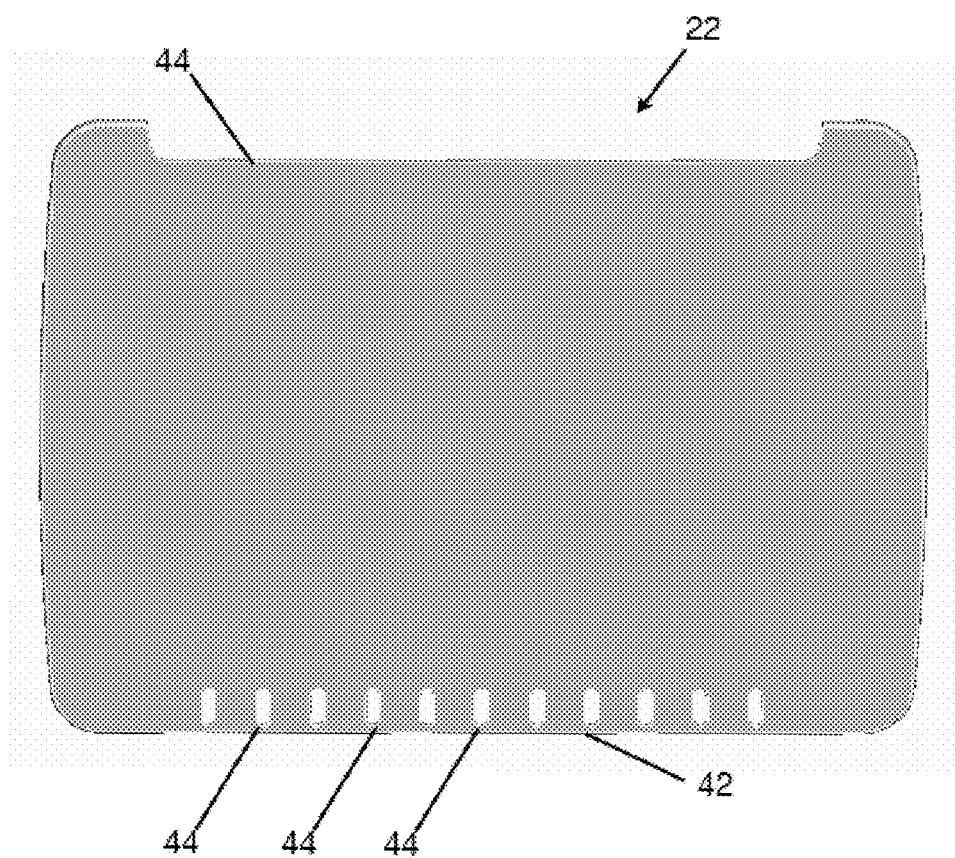
FIG. 4 is an elevation view of the removable and adjustable sidewall.
Figure 5:
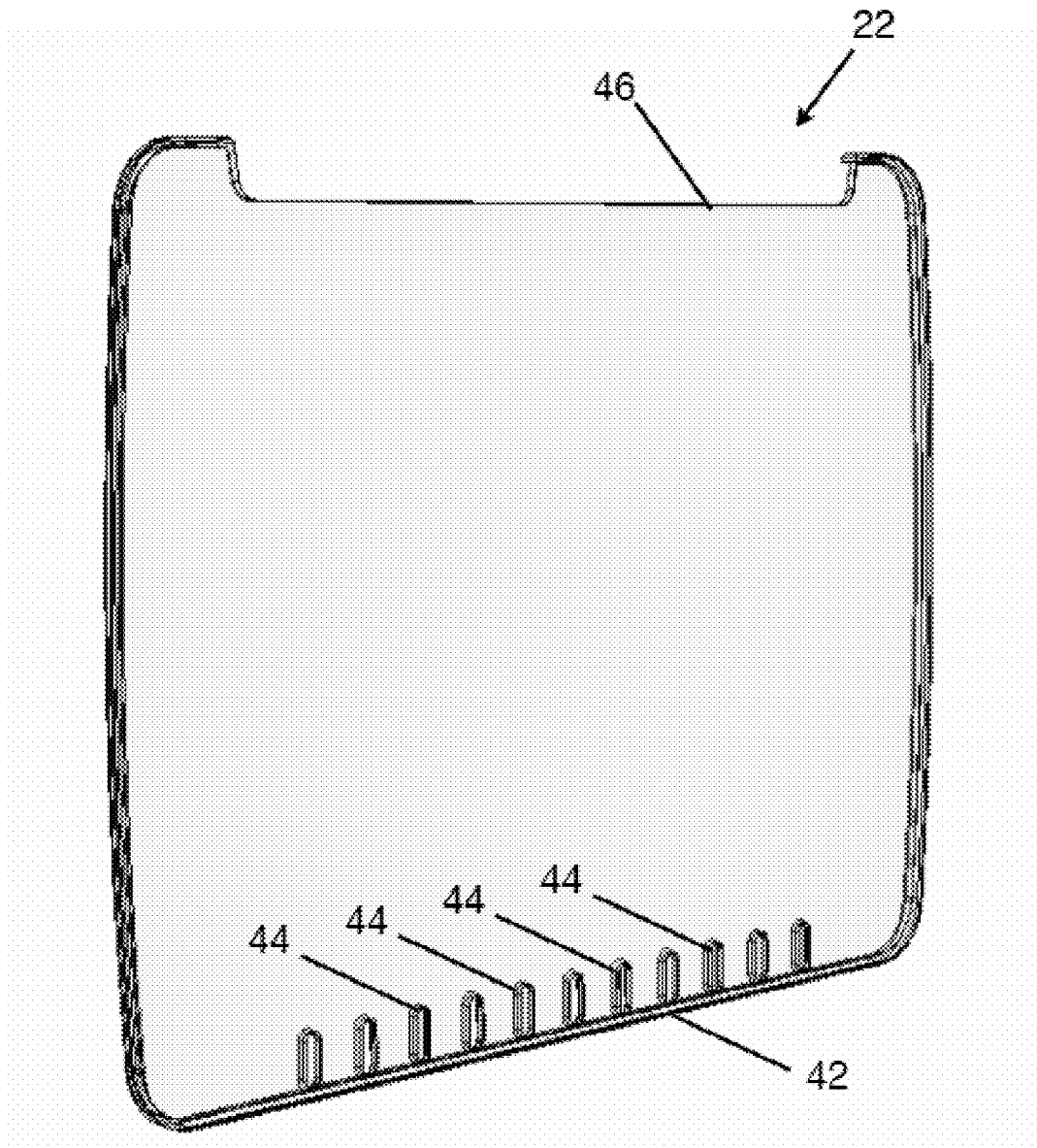
FIG. 5 is the perspective view of sidewall of FIG. 4.
Figure 6:
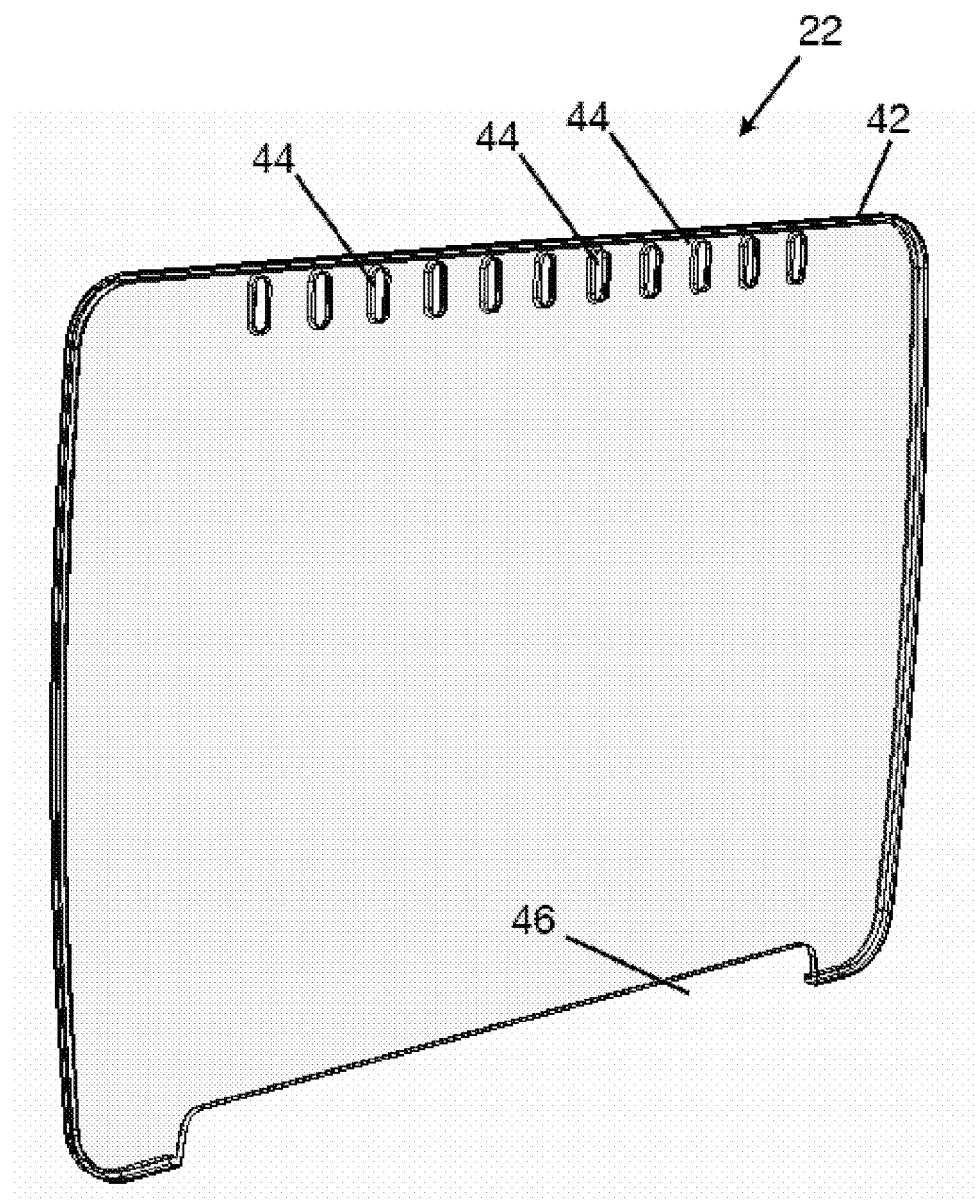
FIG. 6 is the sidewall with the thistle type seed ports along its upper edge and the single open arch forming a large seed port along the bottom edge.

The removable and reversible sidewalls 22 are generally of uniform thickness but have a specific and precise overall planar shape. The shorter sides are gently curved to correspond approximately to the curving shape of the bin chassis end walls and to slide into and out of the slots 20 mentioned above formed between portions of the hanger panel and the hopper chassis 11. The longitudinal bottom edge 42 (refer to FIGS. 4 and 5) is generally straight with a row of several, preferably about a dozen, small elongated slots or ports 44 spaced just above the lowermost edge. These slots are sized to dispense in a controllable manner thistle seed and to help restrict larger birds from accessing the thistle seed. The sizing of these thistle seed ports is well known in the industry, but preferably these thistle seeds ports are about 3½ mm wide×1 cm tall and round at the top and bottom. A single long arch shaped indentation constitutes the majority of the upper longitudinal edge 46 of the side wall panel. This has an overall dimension approximately 10 to 12 cm in overall width and about 2 cm tall. For thistle feeding, both panels are placed in their respective slots 20 on each side of the bin chassis with the thistle ports 44 along at the lower edge as shown in FIGS. 4 and 5. If the user decides to feed larger seeds, each of the side walls is removed from their slots 20, flipped over, and positioned as shown in FIG. 6, that is, with the large arch shaped indentation 46 facing downwardly and thus aligned along the bottom-most portion of the seed supply. Consequently the thistle seed ports are along the now upper edge of the side wall in close proximity to the roof when the roof is in its latched position.

Figure 7:
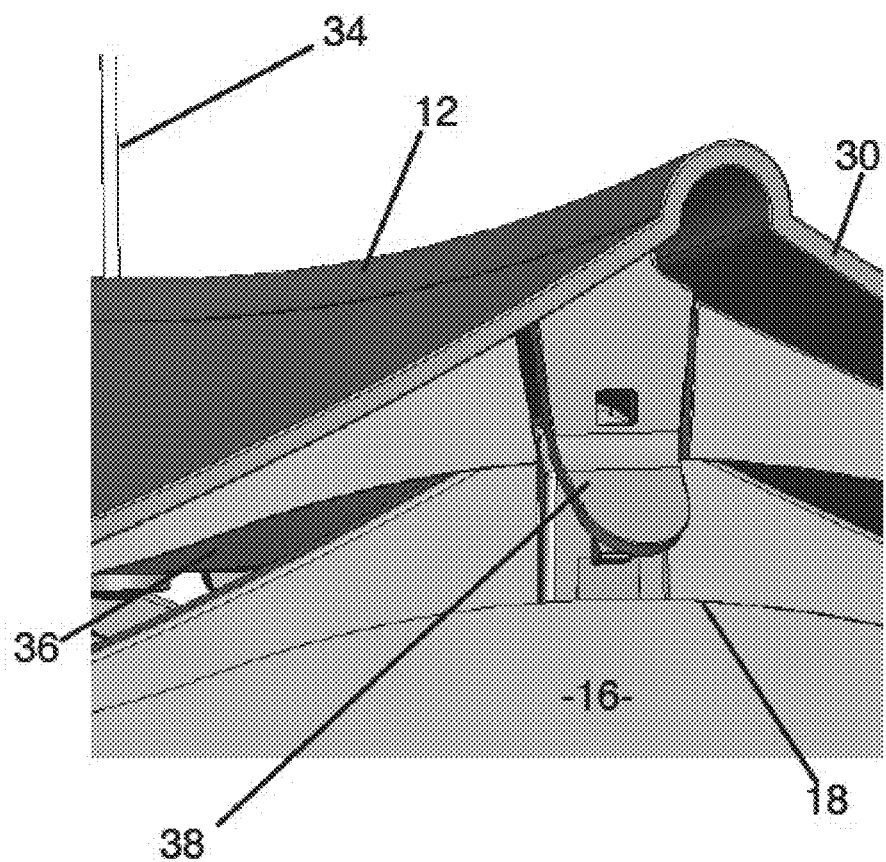
FIG. 7 the close up view of the finger operated detained latch located at the ridge of each gable end of the gable roof.
Figure 8:
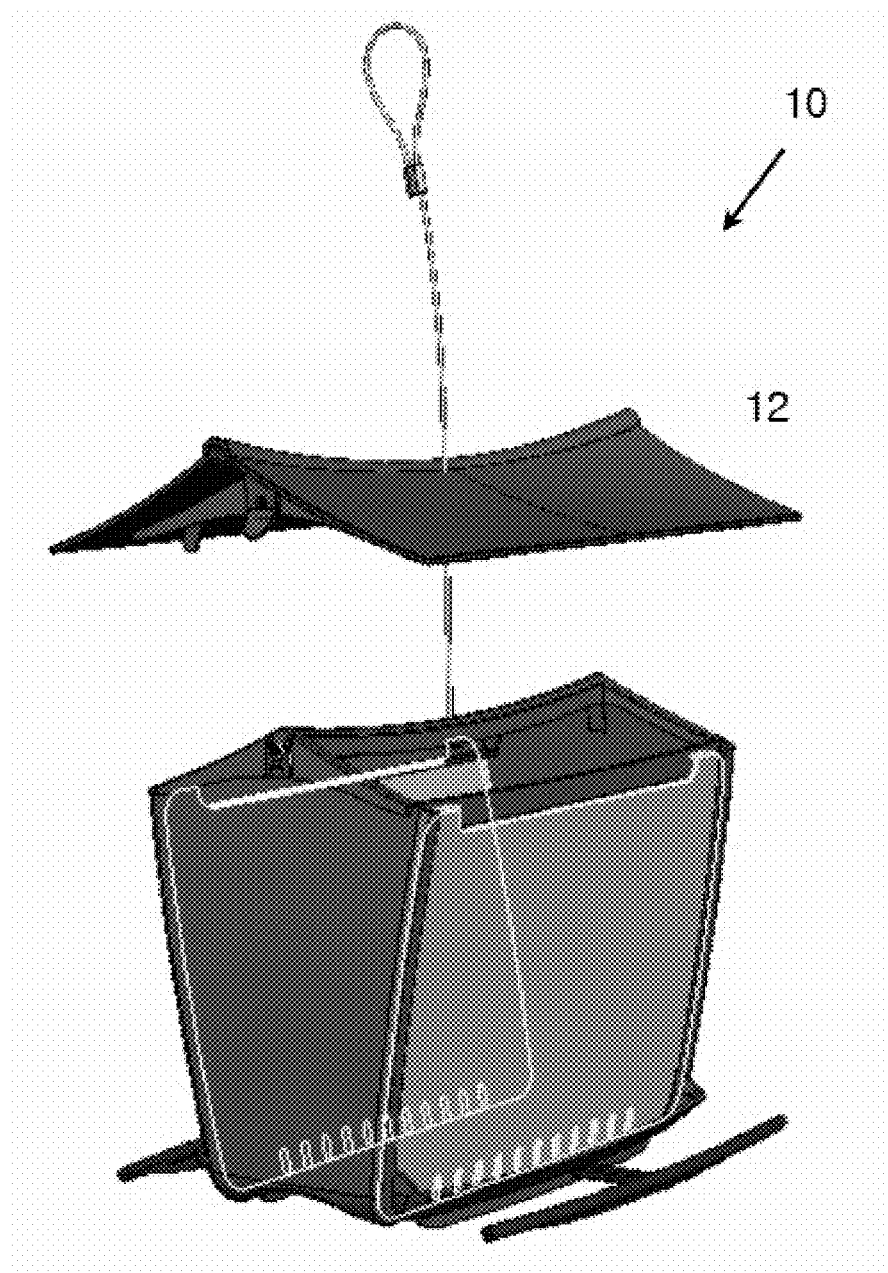
FIG. 8 shows a partially transparent view of the bin with the gable roof slid upwardly to expose the upper edges of the bin sidewalls.

FIG. 7 shows a detail of the latching engagement formed along at the upper edge of the bin and walls and the corresponding portion of the hopper hanger panel. A single sloping detent is formed in the end of the hopper panel which normally rests in a correspondingly shaped opening in the centre of the flexible finger-operated latches 38 at each end of the roof. This latch is designed to resist accidental opening and to resist being opened by a hungry squirrel or the like.

Figure 9:
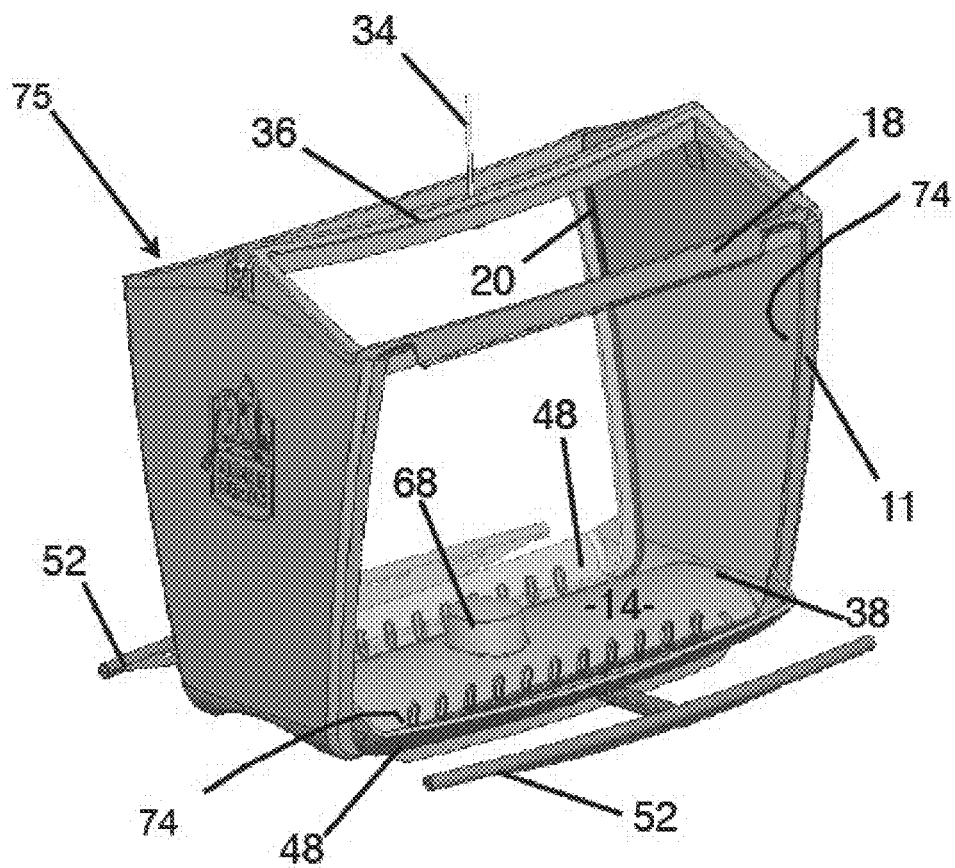
FIG. 9 is a close up view of the bin with the lid removed.

When assembled in the thistle seed feeding configuration as seen in FIG. 9 the thistle ports are lined in close proximity to the bottom of the bin, adjacent the feeding trough 48 integrally formed along each lateral edge the bin floor. The bottom of the bin floor arches up in the middle to help move the supply of seeds towards these thistle ports at the feeding station for feeding such small birds. Each of the two perches can be adjusted accordingly as will be detailed.

Figure 10:
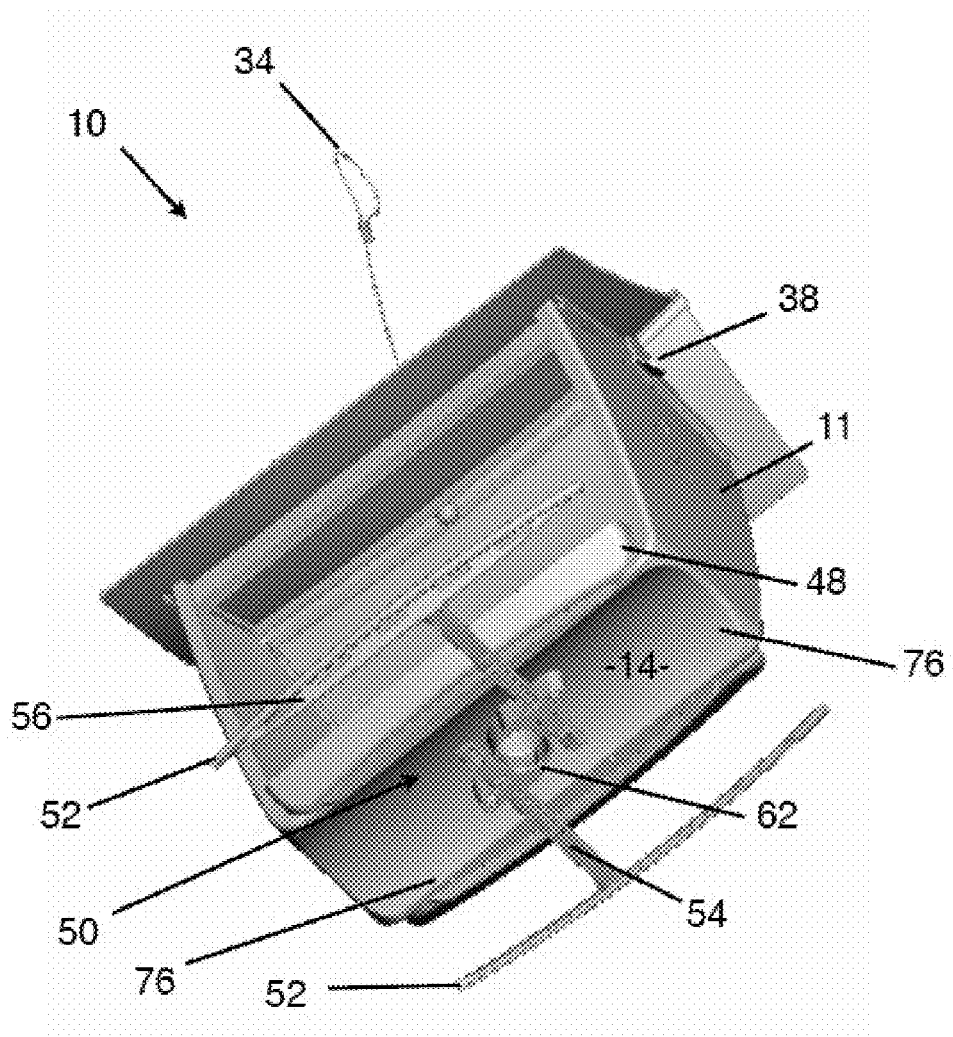
FIG. 10 is a perspective bottom view showing the adjustable perch assembly.

Referring to FIG. 10, the relationship of the adjustable perch assembly 50 and the rest of the bird feeder can be seen. The adjustable perch assembly 50 is positioned inboard of the floor edge portions 76. One can see the pair of feeding troughs 48 and 48 adjacent the perches 52. These are relatively small feeding troughs to retain the seed immediately next to the thistle ports or to the single arch large seed port. Projecting beyond the edge of each trough, an arc-shaped elongated perch 52 is cantilevered from the bottom of the bin by a detented support arm 54. Each perch has a structural member 56 which helps support the relatively small diameter sticklike perch grip. The detented elongated support arm is integrally formed with this arch shaped support, forming a single injection molded construction.

The upper surface of the elongated support 54 includes a series of indentations or detents 58 which receive an end of a flexing finger 60 integrally formed in the perch mount 62. This flexing finger ratchets into and out of the indentations to hold the perching at an optimum position spaced from the outermost edge of the feeding trough.

Figure 11:
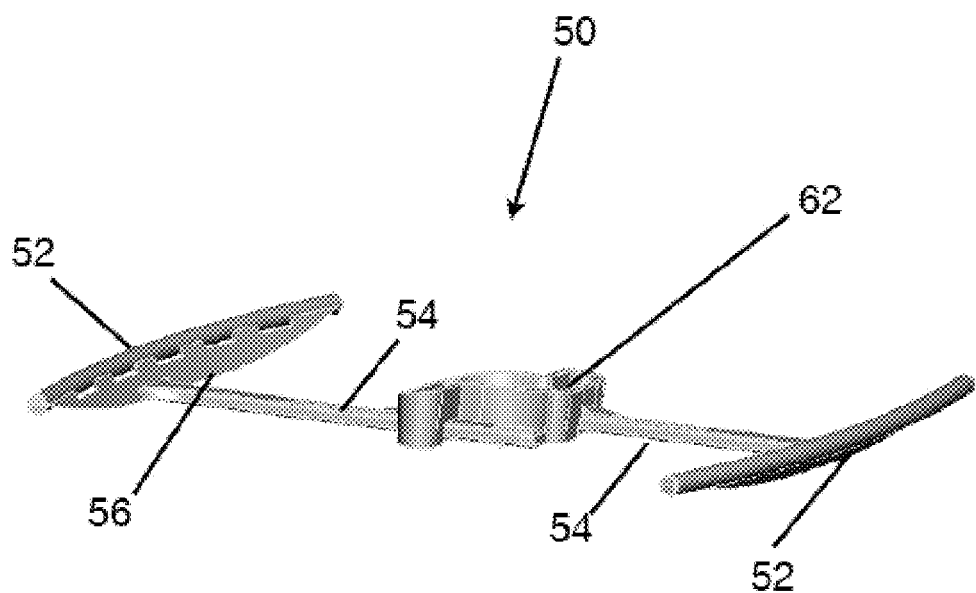
FIG. 11 is a detailed perspective view of the adjustable perch assembly.
Figure 12:
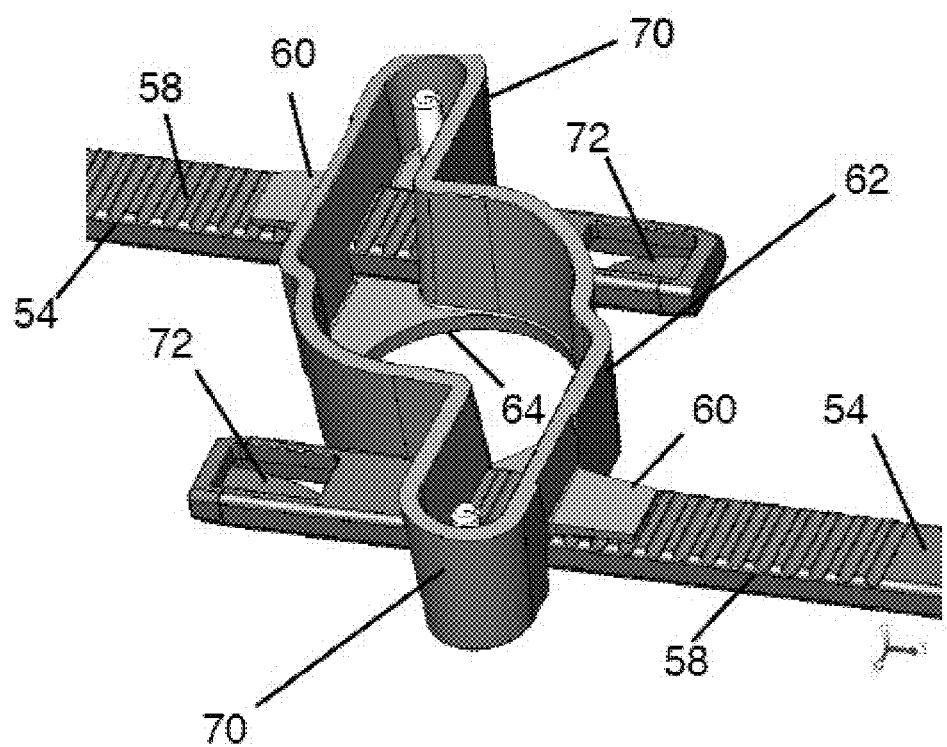
FIG. 12 is a detailed view of the combination pole support and adjustable perches.
Figure 13:
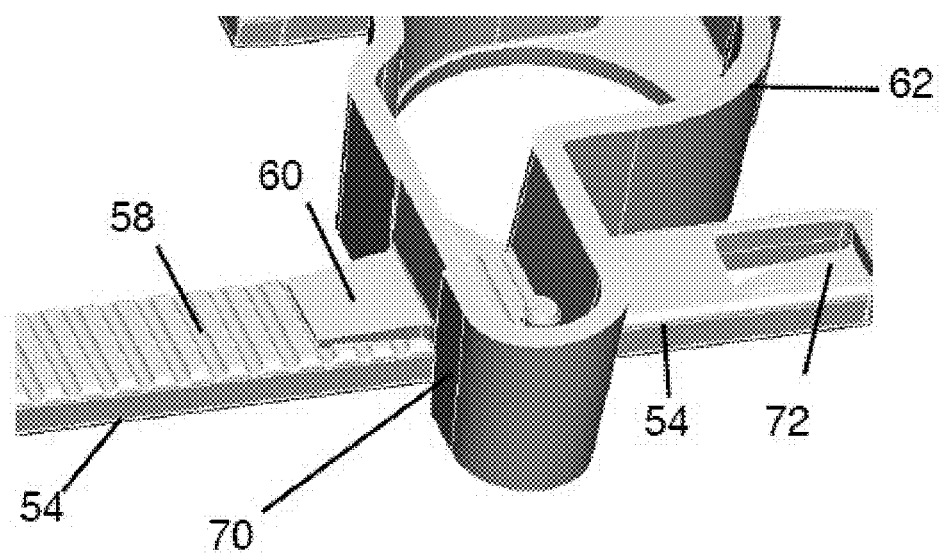
FIG. 13 is a close up view of the detent used to control the positioning of one of the two adjustable perches.

Referring to FIGS. 11 through 13 the hopper perch mount 62 has the overall shape of a Z. The center portion 64 forms a cylindrical cavity which is continuation of the cylindrical receiver 68 in the floor of the hopper chassis, and thus forms a fairly secure and convenient pole mount if the owner chooses to support the in feeder on a slim pole. This is sometimes desirable since the feeder is designed to feed birds only, not squirrels. Sometimes squirrels can be prevented from accessing the bin feeder by fastening it to a tall, smooth pole to keep squirrels from reaching the feeder by climbing the pole, and erecting the pole far from trees where a squirrel might jump down onto the feeder from an adjacent tree.

The perch mount also includes two laterally extending perch support receivers 70. These have correspondingly shaped rectangular holes in the opposed walls of each receiver, one wall having the integrally formed detent finger extending from its outer face. Note that the distal end of the perch support includes a detent finger 72 that flexes into the rectangular holes of the receiver 70 of the perch mount when the perch support is first inserted into the perch mount, but springs outwardly to prevent the perch from being completely removed from the perch mount. When the bin feeder is sold, the perches are pushed into and up against the lower edge of the bin chassis for reduced shipping volume and display but each perch can be pulled out to an optimum position for the particular birds sought to be attracted to the feeder by ratcheting the perch support out to that position. The perch supports are offset from one another to permit the supports to bypass each other in this fully retracted or collapsed state, as well as pass to each side of the pole mounting receiver or cavity. When erected and set to feed birds, the owner would pull outwardly on the perch support to the chosen perch position, which position will be held by the disclosed detent ratchet, etc.

The invention claimed is:

1. A feeder for wild birds comprising:
   a bin having edge portions and a feeding station, the bin adapted to hold bird seed; and
   at least one sidewall having a first edge disposed opposite a second edge, the first edge having a relatively large slot and the second edge having a plurality of relatively small ports, the sidewall being invertible, such that the edge portions of the bin are adapted to receive the sidewall in an orientation based on a size of the bird seed, the orientation positioning the first edge adjacent to the feeding station where the size of the bird seed is relatively large and the orientation positioning the second edge adjacent to the feeding station where the size of the bird seed is relatively small; and a perch positioned adjacent to the feeding station, an elongated support member engaged to the perch, the elongated support member including a plurality of ratchet detents, where the support member is received in a ratchet perch mount mounted to and below a floor of the bin.

2. The feeder of claim 1, wherein the ratchet perch mount includes a flexible finger to engage the plurality of ratchet detents and hold the perch at a one of a plurality of distances away from the feeding station.

3. The feeder of claim 1, wherein the floor includes edge portions, the ratchet perch mount positioned inward from the floor edge portions.

4. The feeder of claim 1, wherein the ratchet perch mount is positioned adjacent to and coaxial with a socket to engage an end of a support pole.

5. The feeder of claim 1, wherein the bin includes a floor defining a socket adapted to engage an end of a support pole.

6. The feeder of claim 1, wherein the feeding station includes a trough adapted to receive the large seeds via the large slot and the small seeds via the plurality of small ports.

7. The feeder of claim 1, wherein the slot is defined by tabs located at opposite sides of the first edge and a gap extending along the first edge between the tabs.

8. The feeder of claim 1, wherein the at least one sidewall is transparent.

9. The feeder of claim 1, wherein the at least one sidewall is a panel of substantially uniform thickness.

10. The feeder of claim 1, further comprising:
a roof adapted to engage the bin to cover the supply of seed.

11. The feeder of claim 10, wherein the roof defines an opening to receive a hanger wire engaged to a ridge beam of the bin, and where the roof is detachable from the bin.

12. A feeder for wild birds comprising:
a bin having a feeding station, the bin adapted to hold a supply of seed;
at least one sidewall having a first edge and a second edge, the first edge having a relatively large slot and the second edge having a plurality of relatively small ports, the at least one sidewall being invertible such that either the first edge or the second edge may be selectively positioned adjacent to the feeding station; and
a perch including a support defining a series of ratchet detents, the support projecting from an inboard receiver mounted to the bin and received in a ratchet perch mount permitting the perch to be positioned at varying distances from the feeding station.

13. The feeder of claim 12, wherein the large slot is sized to permit relatively large seeds to pass therethrough and the small ports are sized to permit relatively small seeds to pass therethrough.

14. The feeder of claim 12, wherein the inboard receiver is positioned adjacent a socket adapted to engage an upper end of a support pole.

* * * * *